3,177,064
CUPOLA MELTING PROCESS FOR PRODUCING GRAY CAST IRON
Walter F. Bohm, Flint, Mich., assignor to General Motors Corporation, Detroit, Mich., a corporation of Delaware
No Drawing. Filed Feb. 24, 1961, Ser. No. 91,325
4 Claims. (Cl. 75—43)

This invention relates to the production of gray cast iron and particularly to a cupola melting process for producing automotive grades of gray iron without using blast furnace pig iron.

As is well-known, gray cast iron normally is produced by re-melting scrap iron along with pig iron in a cupola. The pig iron, which is obtained by smelting iron ore with coke and limestone in a blast furnace, is relatively expensive. Usually this pig iron must be transported a considerable distance, while scrap iron and steel frequently are readily available at the site of the cupola operation.

Accordingly, a principal object of the present invention is to provide a method of producing automotive grades of gray cast iron by means of cupola operations without employing blast furnace pig iron. As hereinafter described in greater detail, this accomplished by concurrecently using an acid-lined cupola and a basic charge cupola. Scrap steel is substituted for the usual blast furnace pig iron, and the irons produced by the two cupolas are blended together to provide the desired gray iron composition.

The cupola which is provided with the conventional acid lining is charged with steel scrap, foundry returns and ferro alloys. No blast furnace pig iron is introduced into this cupola, and commercial alloys containing silicon and manganese are used to furnish the amount of these elements normally provided by the pig iron.

The other cupola, which is fired simultaneously with the acid-lined cupola, preferably is a liningless, water-cooled cupola with projecting tuyeres and carbon well sections. Specifically, a carbon paste may be used for the breast and the basic material blown in the melting zone. While a "basic" lining, such as manganese-chrome brick, may be used in the basic cupola, it is considerably less expensive to provide the cupola with water cooling and a carbon well. A liningless, water-cooled shell also provides the cupola with an inside diameter of constant size, a condition which is advantageous for good control. Moreover, lining erosion is eliminated as a source of slag contamination, thereby simplifying the task of maintaining proper slag control in the basic cupola. In addition to these advantages, a basic cupola designed in this manner permits the use of week-long heats without dropping bottom.

A highly basic slag is developed when melting with this cupola by adding to the charge such materials as limestone, dolomite, soda ash and fluorspar. In general, approximately 130 to 200 pounds of such a flux is added per ton of steel being re-melted. This slag promotes carbon pickup and reduces sulfur absorption by the metal being melted. Consequently, the sulfur content of the melt is similar to that of blast furnace pig. Of course, pig iron normally is used as one of the basic methods of controlling the carbon content in gray cast iron. Thus it will be seen that the use of this basic cupola provides the gray iron with the same properties and chemical composition, except for silicon and manganese contents, it usually derives from the inclusion of pig iron in the melt.

Inexpensive steel of almost any type, such as briquettes, bundles, etc., is used in this process to replace the pig iron in the basic slag cupola. Steel briquettes having either high or low silicon contents are usually employed as a charge material to produce an iron containing about 3.8% to 4% carbon, approximately the same carbon content as in malleable pig iron. Neither silicon nor manganese normally is added to the metal charge in the basic cupola, and this charge generally consists entirely of scrap steel. When the melts from the two cupolas are blended together, ladle additions of these elements may be used to produce specific gray cast iron compositions. Usually, however, sufficient silicon and manganese can be added to the acid-lined cupola to provide the desired analysis. Thus, the most difficult elements to control in a basic slag cupola are eliminated, together with the adverse effect of silicon on carbon solubility and hence on carbon control. Likewise, the high oxidation losses of silicon and manganese are prevented, and there is no slag chemistry problem resulting from the oxidation of silicon.

The acid-lined cupola preferably contains a conventional cylinder iron mix minus the usual malleable pig iron. Silicon and maganese may be added in any convenient form, preferably as lump silicon-manganese, to compensate for the absence of pig iron. A typical charge for the acid cupola is as follows:

|   | Weight, Lbs. | Silicon, Lbs. | Carbon, Lbs. | Manganese, Lbs. |
|---|---|---|---|---|
| Steel | 1,200 | 2.4 | 3.6 | 6.0 |
| Returns | 1,292 | 31.1 | 44.0 | 7.77 |
| Borings | 1,000 | 24.0 | 24.0 | 6.0 |
| 20% Silicon Pig | 210 | 42.0 |  | 2.1 |
| Alloyed Ferrosilicon | 130 | 26.0 |  | 1.3 |
| Lump Silicon-Manganese | 18 | 3.0 |  | 11.7 |
| Total Pounds | 3,850 | 128.5 | 81.6 | 34.87 |

The "alloy ferrosilicon" listed above typically is composed, by weight of about 20% silicon, 4% chromium, 1% magnesium, 0.6% nickel and the balance iron.

Excellent results have been obtained when the iron in the basic slag cupola is melted at a temperature of about 2800° F. and the iron in the acid-lined cupola is melted at approximately 2850° F. After the melts have reached these temperatures, the molten iron from the two cupolas is thoroughly mixed on a weight basis at a temperature of about 2800° F. to 2850° F. to provide a gray iron containing approximately 2.7% to 3.8% total carbon, 0.6% to 3% silicon and 0.5% to 0.9% manganese. In order to produce a satisfactory "automotive grade" gray cast iron, the chemistry of the melts is regulated so that the final product consists, by weight, essentially of 3% to 3.5% carbon, 2% to 2.5% silicon, 0.55% to 0.75% maganese, 0.2% maximum phosphorus, 0.2% maximum sulfur and the balance iron.

The hard iron produced by this process preferably is a mixture of about 25% to 40% by weight of basic cupola iron and 60% to 75% by weight of acid cupola iron, while soft iron is prepared from approximately 50% to 70% by weight of basic cupola iron and 30% to 50% by weight of acid cupola iron. Silicon normally is added to the ladle in preparing the soft iron blend. To produce cylinder iron using a charge of the size shown in the aforementioned example, approximately 1,150 pounds of iron from the basic cupola is substituted for the same amount of malleable pig normally employed. A blend of about 3,125 pounds of basic iron and 1,875 pounds of the above-described acid iron is used to make a soft gray cast iron containing, by weight, approximately 3.5% carbon, 1.24% silicon and 0.34% manganese. Ladle additions of about 1.2% silicon and 0.15% manganese are used.

The gray cast iron produced by the above-described process can be conveniently and inexpensively made with a lower silicon content and a higher carbon content to provide improved castability, reduced shrinkage and better machinability.

While my invention has been described by means of certain specific examples, it is to be understood that its scope is not to be limited thereby except as defined by the following claims.

I claim:
1. A method of producing gray cast iron without using blast furnace pig iron, said method comprising melting steel and scrap iron together in an acid-lined cupola, melting scrap steel in a basic slag cupola, blending the output from the two cupolas at a temperature of about 2800° F. to 2850° F. in a proportion of 30% to 75% output of the acid-lined cupola and 25% to 70% output of the basic slag cupola, adding silicon and manganese to the resultant melt, and thereafter pouring the gray cast iron thus produced.

2. A method of producing automotive grade gray cast iron without using blast furnace pig iron, said method comprising melting a blast furnace pig iron-free charge of steel, scrap iron, and silicon- and manganese-containing constituents in an acid-lined cupola, melting steel and at least one alkali flux in a liningless, water-cooled cupola, and thereafter thoroughly mixing the molten iron produced in the two cupolas in a ratio to provide a gray cast iron composition containing approximately 3% to 3.5% carbon, 2% to 2.5% silicon, 0.55% to 0.75% manganese, phosphorus not in excess of 0.2% and sulfur not in excess of 0.2%.

3. A method of producing gray cast iron without using blast furnace pig iron, said method comprising melting a charge free of blast furnace pig iron and consisting essentially of steel, scrap iron and silicon- and manganese-containing constituents in an acid-lined cupola, concurrently melting scrap steel and at least one alkali flux selected from the group consisting of limestone, dolomite, soda ash and fluorspar in a liningless, water-cooled cupola having carbon well sections, thoroughly mixing the output from the two cupolas in molten form in a proportion of 30% to 75% output of the acid-lined cupola and 25% to 70% output of the basic slag cupola, and thereafter pouring the resultant gray cast iron into a ladle for forming gray iron castings.

4. A method of producing automotive grade gray cast iron without using blast furnace pig iron, said method comprising melting steel, scrap iron and silicon- and manganese-containing constituents in an acid-lined cupola, concurrently melting steel and at least one alkali flux selected from the group consisting of limestone, dolomite, soda ash and fluorspar in a liningless, water-cooled cupola having projecting tuyeres and carbon well sections, and thereafter blending the output from the two furnaces at a temperature of approximately 2800° F. to 2850° F. in a proportion to provide a gray cast iron composition containing about 2.7% to 3.8% total carbon, 0.6% to 3% silicon and 0.5% to 0.9% manganese.

References Cited by the Examiner
UNITED STATES PATENTS
843,197   2/07   Davis _____ 75—130

OTHER REFERENCES

The ASM Metals Handbook, published by the American Society of Metals, Cleveland, Ohio, 1948, page 507.

Transactions of the American Foundrymen's Society, vol. 50 (of record in paper No. 2), page 525.

Transactions of the American Foundrymen's Society, vol. 60, pages 526, 751, 752, and 753. Published in 1952 by the Society.

BENJAMIN HENKIN, *Primary Examiner.*

MARCUS U. LYONS. DAVID L. RECK, WINSTON A. DOUGLAS, *Examiners.*

UNITED STATES PATENT OFFICE
CERTIFICATE OF CORRECTION

Patent No. 3,177,064                 April 6, 1965

Walter F. Bohm

It is hereby certified that error appears in the above numbered patent requiring correction and that the said Letters Patent should read as corrected below.

Column 1, line 41, for "manganese-chrome" read -- magnesite-chrome --; column 2, line 31, for '"alloy ferrosilicon"' read -- "alloyed ferrosilicon" --; line 64, for "1.24%" read -- 1.23% --.

Signed and sealed this 17th day of August 1965.

(SEAL)
Attest:

ERNEST W. SWIDER                      EDWARD J. BRENNER
Attesting Officer                       Commissioner of Patents